H. E. BLOOD.
VEHICLE SEAT.
APPLICATION FILED FEB. 9, 1914.
1,125,801.
Patented Jan. 19, 1915.
2 SHEETS—SHEET 1.
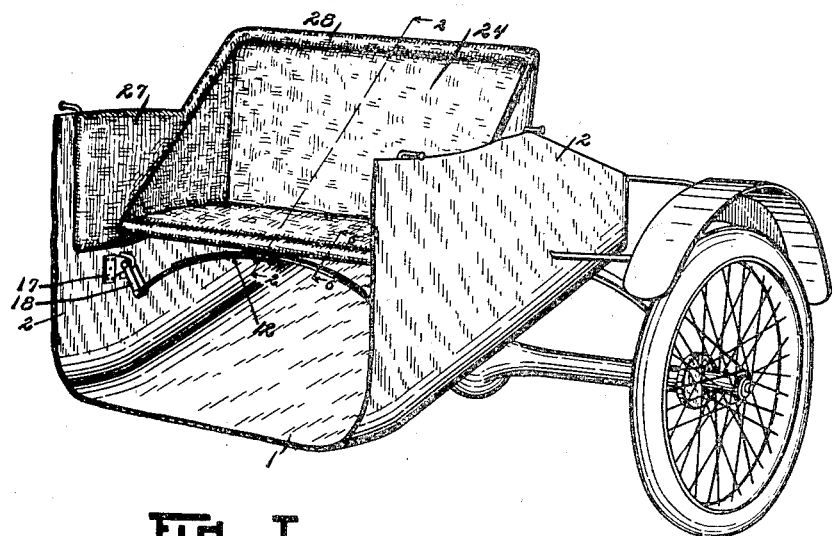
Fig. I.
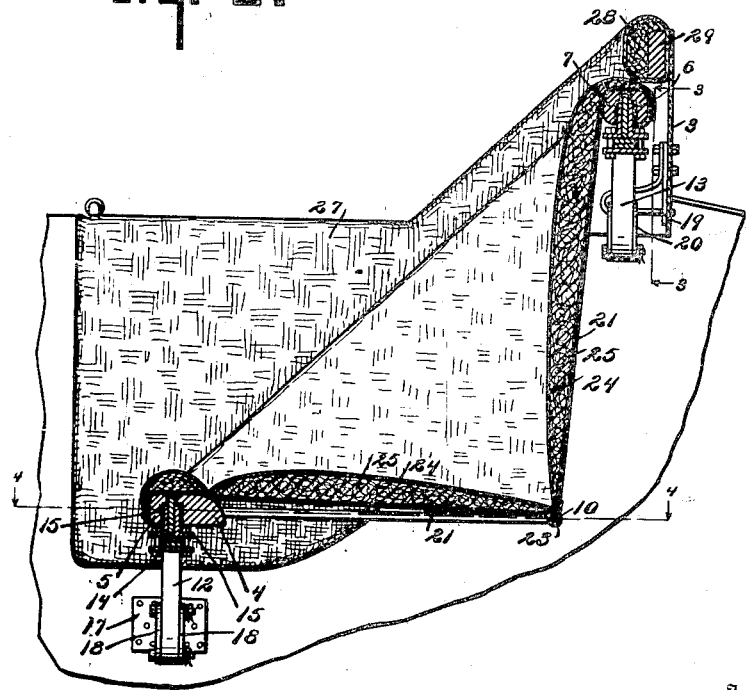
Fig. II.
Witnesses
Grace B. Thompson
M. L. Glasgow
Inventor
Howard E. Blood
By Chappell Earl
Attorneys H. E. BLOOD.
VEHICLE SEAT.
APPLICATION FILED FEB. 9, 1914.
1,125,801.
Patented Jan. 19, 1915.
2 SHEETS—SHEET 2.
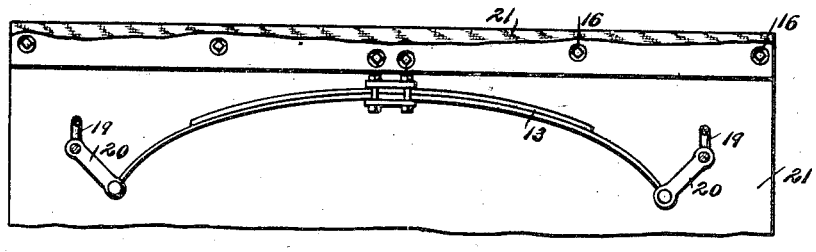
Fig. III.
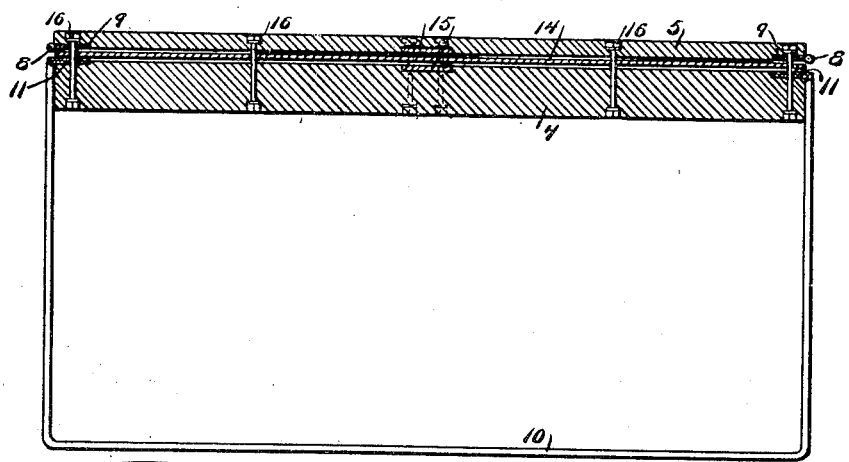
Fig. IV.
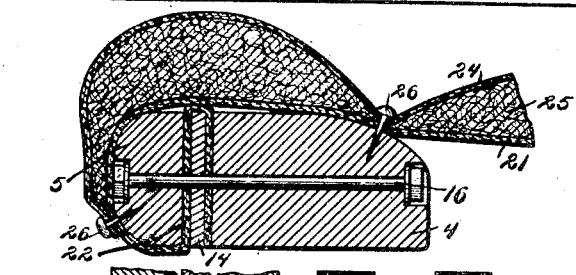
Fig. V.
Fig. VI.
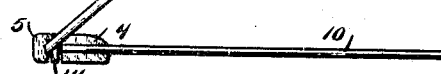
Fig. VII.
Witnesses
Grace F. Thompson
M. L. Glasgow
Inventor
Howard E. Blood
By Chappell & Earl
Attorneys

UNITED STATES PATENT OFFICE.

HOWARD E. BLOOD, OF KALAMAZOO, MICHIGAN.

VEHICLE-SEAT.

1,125,801. Specification of Letters Patent. Patented Jan. 19, 1915.

Application filed February 9, 1914. Serial No. 817,475.

*To all whom it may concern:*

Be it known that I, HOWARD E. BLOOD, a citizen of the United States, residing at Kalamazoo, Michigan, have invented certain new and useful Improvements in Vehicle-Seats, of which the following is a specification.

This invention relates to improvements in vehicle seats.

My improved vehicle seat is especially designed by me for embodiment in motor vehicles of the cycle car type, or other vehicles where it is desirable to produce a light, economical spring seat structure. My improvements are, however, advantageous for use in other relations and may be readily adapted for such use.

The main objects of this invention are: to provide an improved vehicle seat which is very comfortable and easy in use, light in weight and compact and economical in structure.

Further objects, and objects relating to structural details will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a detail perspective view of a cycle car embodying the features of my invention. Fig. II is a detail vertical longitudinal section on a line corresponding to line 2—2 of Fig. I. Fig. III is a detail transverse vertical section on a line corresponding to the line 3—3 of Fig. II, the flexible seat body on the rear of the back bar being broken away. Fig. IV is a detail horizontal section on a line corresponding to line 4—4 of Fig. II. Fig. V is an enlarged detail vertical section through the seat bar on a line corresponding to line 5—5 of Fig. I. Fig. VI is an enlarged detail longitudinal section through the seat bar corresponding to that of Fig. IV, the flexible seat body being omitted. Fig. VII is an end view of the seat and back bars, the end bar and the seat frame.

In the drawing similar reference characters refer to similar parts throughout the several views, and the sectional views are taken looking in the direction of the little arrows at the ends of the section lines.

Referring to the lettered parts of the drawing, the body 1 of the embodiment of my invention illustrated is formed of sheet metal and has side walls 2 and a back wall 3. The rear portion only of the body is illustrated. A seat bar formed of longitudinal sections 4 and 5 is disposed at the front edge of the seat. A back bar formed of longitudinal sections 6 and 7 is disposed at the top of the back. These bars are connected by rod-like side bars 8, the ends of the side bars being turned inwardly to form attaching members 9, the attaching members being disposed between the sections of the seat and back bars and clamped thereby. A bail-like seat frame member 10 is carried by the seat bar. This seat member 10 is, in the structure shown, formed of a rod. The ends of the arms of the seat frame member 10 are turned inwardly to provide attaching members 11, which are clamped between the seat bar sections. See Fig. IV. The seat is carried by semi-elliptic springs 12 and 13. The spring 12 is disposed below the seat bar, while the spring 13 is disposed below the back bar. The springs are connected to the seat bars by clips 15 having upwardly projecting arms clamped between the bar sections, as illustrated.

The clamping bolts 16 at the ends of the bars pass through the inturned ends of the seat frame member and end bars. The central clamping bolts pass through the arms of the clip members.

The spring 12 is suspended from brackets 17 on the side walls of the body, the ends of the springs being connected to the brackets by the links 18. The spring 13 is supported by the brackets 19 on the rear walls 3 of the body, being suspended therefrom by links or shackles 20.

The flexible seat body 21 is preferably formed of canvas and is secured to the seat and back bar by passing its forward edge over the seat bar and folding between the bar sections. The upper edge of the flexible seat body is passed over the back bar and folded between its sections. The clamping strips 14 engage the folds 22, as shown in the enlarged view, Fig. V. The bolts passing through these clamping strips clamp the bar sections upon the folded edges of the canvas and secures the canvas so that it is not easily torn and is attached throughout.

The body member is provided with suitable end portions which are secured to the rods 8. The body is also secured to the seat frame member by means of the pieces 23. See Fig. II. The pieces 23 are arranged over the cross portion of the frame member and attached to the body member.

The seat is upholstered by providing a cover 24 of leather or other suitable flexible material and a filling 25, the filling illustrated being of curled hair. This covering is attached to the seat bars by means of the tacks 26. The sides of the body are upholstered at 27 at each end of the seat, the seat being supported by the springs so that the body extends above the same. The ends of the seat are a fairly close fit with the upholstered sides of the body, supporting the seat laterally. This also adds to the finished appearance of the structure.

The back of the body is upholstered at 28 above the back of the seat, there being a roll of upholstering secured by means of the bar 29, which clamps the edges of the covering, as shown in Fig. II. The top of the seat back in its normal position rests against the under side of this upholstering, as shown in Fig. II. This also adds to the appearance and finish of the structure. The front surface of the back of the seat is well in advance of the surface of this upholstering 28 so that the occupants of the seat are supported entirely by the seat, that is, they do not rest upon the body.

My improved seat is light and compact in structure, and at the same time is very comfortable and easy for the user. The springs are disposed so that very resilient springs may be used.

I have illustrated and described my improvements in an embodiment which I have found satisfactory. I have not attempted to illustrate or describe various modifications which I contemplate, as I believe the disclosure made will enable those skilled in the art to which this invention relates to embody or adapt the same as conditions may require. I desire, however, to be understood as claiming my improvements specifically in the form illustrated, as well as broadly within the scope of the appended claims.

Having thus described my invention, what I claim as new and desire to secure by Letters Patent is:

1. In a structure of the class described, the combination of longitudinally sectioned seat and back bars, the seat bar being disposed at the front of the seat, the back bar being disposed at the top of the back, side bars connecting said seat and back bars, said side bars having inwardly turned ends clamped between the bar sections, a horizontally disposed bail-shaped seat frame member, the arms of said frame member having inwardly turned ends clamped between the bar sections, a seat body member of flexible material secured to said seat and back bars, said end bars and to said seat frame member, the front edge of said body member being disposed over the seat bar and folded between the sections thereof from below, the top edge of said body member being disposed over said back bar and folded between the sections thereof from below, clamping strips disposed between the bar sections in the folded edges of said body member, springs disposed below said seat and back bars, clips for said springs having upwardly projecting arms clamped between the bar sections, and clamping bolts for said bar sections engaging the inturned ends of said seat frame member arms and said side bars.

2. In a structure of the class described, the combination of longitudinally sectioned seat and back bars, the seat bar being disposed at the front of the seat, the back bar being disposed at the top of the back, side bars connecting said seat and back bars, a horizontally disposed bail-shaped seat frame member, the arms of said frame member being secured to the ends of said seat bar, a seat body member of flexible material secured to said seat and back bars, said end bars and to said seat frame member, the front edge of said body member being disposed over the seat bar and folded between the sections thereof from below, the top edge of said body member being disposed over said back bar and folded between the sections thereof from below, clamping strips disposed between the bar sections in the folded edges of said body member, springs disposed below said seat and back bars, clips for said springs having upwardly projecting arms clamped between the bar sections.

3. In a structure of the class described, the combination of a vehicle body comprising side and rear walls, longitudinally sectioned seat and back bars, the seat bar being disposed at the front of the seat, the back bar being disposed at the top of the back, side bars connecting said seat and back bars, a horizontally disposed bail-shaped seat frame member, the arms of said frame member being secured to the ends of said seat bar, a seat body member of flexible material secured to said seat and back bars, said end bars and to said seat frame member, the front edge of said body member being disposed over the seat bar and engaged between the sections thereof from below, the top edge of said body member being disposed over said back bar and engaged between the sections thereof from below, said seat having an upholstering comprising a flexible covering and a filling between the covering and the body member, semi-elliptic springs disposed below said seat and back bars, spring hangers on said body, disposed so that the seat is supported with its upper edges below the upper edges of the body at the sides and back thereof, the body being upholstered at the ends and above the back of the seat, clips for said springs having upwardly projecting arms clamped between the bar sections.

4. In a structure of the class described, the combination of a longitudinally sectioned seat and back bars, the seat bar being disposed at the front of the seat, the back bar being disposed at the top of the back, side bars connecting said seat and back bars, said side bars having inwardly turned ends clamped between the bar sections, a horizontally disposed bail-shaped seat frame member, the arms of said frame member having inwardly turned ends clamped between the bar sections, a seat body member of flexible material secured to said seat and back bars, and to said seat frame member, the front edge of said body member being disposed over the seat bar and engaged between the sections thereof from below, the top edge of said body member being disposed over said back bar and engaged between the sections thereof from below, springs, spring clips for said springs having arms clamped between the bar sections, and clamping bolts for said bar sections engaging the inturned ends of said seat frame member arms and said side bars.

5. In a structure of the class described, the combination of a longitudinally sectioned seat and back bars, the seat bar being disposed at the front of the seat, the back bar being disposed at the top of the back, side bars connecting said seat and back bars, a horizontally disposed seat frame member secured to said seat bar, a seat body member of flexible material secured to said seat and back bars, and to said seat frame member, the front edge of said body member being disposed over the seat bar and engaged between the sections thereof from below, the top edge of said body member being disposed over said back bar and engaged between the sections thereof from below, springs, and spring clips for said springs having arms clamped between the bar sections.

6. In a structure of the class described, the combination of a longitudinally sectioned seat and back bars, the seat bar being disposed at the front of the seat, the back bar being disposed at the top of the back, side bars connecting said seat and back bars, a horizontally disposed bail-shaped seat frame member secured to said seat bar, a seat body member of flexible material secured to said seat and back bars, and to said seat frame member, the front edge of said body member being disposed over the seat bar and engaged between the sections thereof from below, the top edge of said body member being disposed over said back bar and engaged between the sections thereof from below, and supporting springs connected to said bars.

7. In a structure of the class described, the combination of a vehicle body comprising side and rear walls, seat and back bars, the seat bar being disposed at the front of the seat, the back bar being disposed at the top of the back, side bars connecting said seat and back bars, a horizontally disposed bail-shaped seat frame member, the ends of the arms of said frame member being secured to said seat bar, a seat body member of flexible material secured to said seat and back bars, said end bars and to said seat frame member, semi-elliptic springs disposed below said seat and back bars, spring hangers on said body, disposed so that the seat is supported with its upper edges below the upper edges of the body at the sides and back thereof, the body being upholstered at the ends and above the back of the seat, and clips for attaching said springs to said bars.

8. In a structure of the class described, the combination of seat and back bars, the seat bar being disposed at the front of the seat, the back bar being disposed at the top of the back, side bars connecting said seat and back bars, a horizontally disposed bail-shaped seat frame member, the ends of the arms of said frame member being secured to said seat bar, a seat body member of flexible material secured to said seat and back bars, said end bars and to said seat frame member, and semi-elliptic springs disposed below said seat and back bars.

9. In a structure of the class described, the combination of a vehicle body comprising side and rear walls, seat and back bars, the seat bar being disposed at the top of the back, side bars connecting said seat and back bars, a horizontally disposed seat frame member secured to said seat bar, a seat body member of flexible material secured to said seat and back bars, semi-elliptic springs disposed below said seat and back bars and connected thereto, spring hangers for the front spring mounted on the side walls of the body, and spring hangers for the rear spring mounted on the rear wall of the body.

10. In a structure of the class described, the combination of seat and back bars, the seat bar being disposed at the top of the back, side bars connecting said seat and back bars, a horizontally disposed seat frame member secured to said seat bar, a seat body member of flexible material secured to said seat and back bars, a horizontally disposed seat frame member secured to said seat bar, a seat body member of flexible material secured to said seat and back bars and said frame member and semi-elliptic springs disposed below said seat and back bars and connected centrally thereto, said springs being supported by links at their ends.

11. In a structure of the class described, the combination of seat and back bars, the seat bar being disposed at the front of the seat, the back bar being disposed at the top of the back, side bars connecting said seat and back bars, a horizontally disposed seat frame member secured to said seat bar, a seat body member of flexible material secured to said seat and back bars, and springs disposed below said seat and back bars and connected thereto.

In witness whereof, I have hereunto set my hand and seal in the presence of two witnesses.

HOWARD E. BLOOD. [L. S.]

Witnesses:
LUELLA G. GREENFIELD,
GRACE B. THOMPSON.